United States Patent
Otani

(10) Patent No.: US 10,142,603 B2
(45) Date of Patent: Nov. 27, 2018

(54) IMAGE DISPLAY DEVICE, PROJECTOR, AND TRANSMISSION TYPE DISPLAY DEVICE

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/554,675

(22) PCT Filed: Feb. 16, 2016

(86) PCT No.: PCT/JP2016/000798
§ 371 (c)(1),
(2) Date: Aug. 30, 2017

(87) PCT Pub. No.: WO2016/139903
PCT Pub. Date: Sep. 9, 2016

(65) Prior Publication Data
US 2018/0041739 A1    Feb. 8, 2018

(30) Foreign Application Priority Data

Mar. 2, 2015  (JP) ................................ 2015-039950

(51) Int. Cl.
*H04N 9/31*   (2006.01)
*G02F 1/29*   (2006.01)
(Continued)

(52) U.S. Cl.
CPC .............. *H04N 9/317* (2013.01); *G02B 6/00* (2013.01); *G02B 6/0011* (2013.01); *G02F 1/29* (2013.01);
(Continued)

(58) Field of Classification Search
CPC .... H04N 9/317; H04N 9/3105; H04N 9/3152; H04N 5/64; H04N 9/3185; H04N 9/3194;
(Continued)

(56) References Cited

U.S. PATENT DOCUMENTS 6,023,373 A    2/2000  Inoguchi et al.
7,778,508 B2   8/2010  Hirayama
(Continued)

FOREIGN PATENT DOCUMENTS

JP    H11-337863 A    12/1999
JP    2000-067788 A    3/2000
(Continued)

OTHER PUBLICATIONS

Apr. 19, 2016 International Search Report issued in International Patent Application No. PCT/JP2016/000798.

*Primary Examiner* — Andrew Sasinowski
(74) *Attorney, Agent, or Firm* — Oliff PLC

(57) ABSTRACT

An image display device capable of being incorporated into a projector, an HMD, or the like and capable of adjusting an image formation position for each image area, a projector, and a transmission type display device into which the image display device is incorporated. In an image display device, a refractive index distribution regarding a passing area of light emitted from an optical modulation device is changed by a pixel unit of a refractive index distribution variable panel. In a projector in which the image display device is incorporated, the refractive index distribution variable panel is inserted immediately after the optical modulation device so as to make it possible to perform focusing at all areas even for a screen (surface to be irradiated) having any shape.

8 Claims, 7 Drawing Sheets

(51) Int. Cl.
*F21V 8/00* (2006.01)
*G02B 27/01* (2006.01)
*G02B 6/00* (2006.01)
*G03B 21/53* (2006.01)
*G03B 35/00* (2006.01)
*H04N 5/64* (2006.01)
*G02F 1/1347* (2006.01)

(52) U.S. Cl.
CPC ............ *G03B 21/53* (2013.01); *G03B 35/00* (2013.01); *H04N 9/3105* (2013.01); *H04N 9/3167* (2013.01); *H04N 9/3185* (2013.01); *H04N 9/3194* (2013.01); *G02B 27/0172* (2013.01); *G02B 2027/013* (2013.01); *G02B 2027/014* (2013.01); *G02B 2027/0112* (2013.01); *G02B 2027/0125* (2013.01); *G02B 2027/0134* (2013.01); *G02B 2027/0138* (2013.01); *G02B 2027/0145* (2013.01); *G02B 2027/0178* (2013.01); *G02F 1/13471* (2013.01); *G02F 2001/294* (2013.01); *H04N 5/64* (2013.01); *H04N 9/3152* (2013.01)

(58) Field of Classification Search
CPC ...... H04N 9/3167; G03B 21/53; G03B 35/00; G02B 27/22; G02B 27/02; G02B 2027/0178; G02B 2027/0125; G02B 2027/0134; G02B 2027/0112; G02B 2027/0138; G02B 2027/014; G02B 2027/0145; G02B 2027/013; G02B 6/0011; G02B 6/00; G02B 27/0172; G02F 1/13471; G02F 2001/294; G02F 1/29

See application file for complete search history.

(56) References Cited

U.S. PATENT DOCUMENTS

| | | | |
|---|---|---|---|
| 2011/0285973 A1 | 11/2011 | Togino | |
| 2014/0063381 A1* | 3/2014 | Zhang | H04N 13/398 349/15 |
| 2015/0009434 A1* | 1/2015 | Yang | G02B 27/2214 349/15 |
| 2016/0320623 A1* | 11/2016 | Miyao | G02B 27/0172 |

FOREIGN PATENT DOCUMENTS

| | | |
|---|---|---|
| JP | 2002-214579 A | 7/2002 |
| JP | 2011-242580 A | 12/2011 |
| JP | 5282358 B2 | 9/2013 |

* cited by examiner

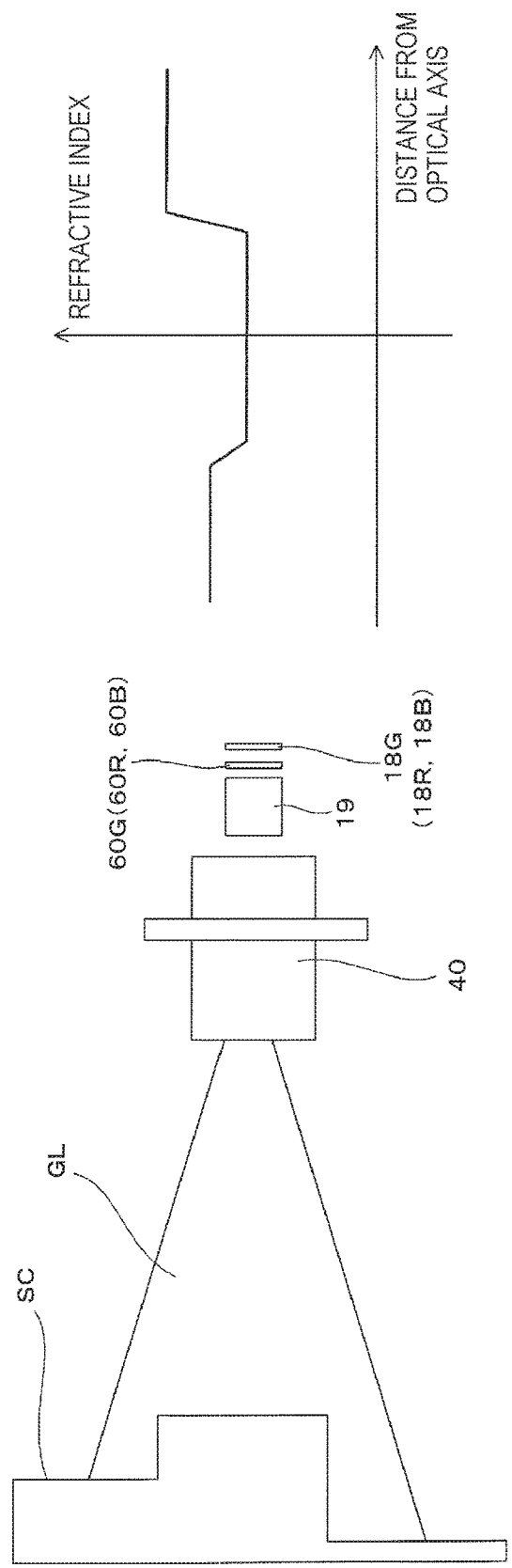

IMAGE DISPLAY DEVICE, PROJECTOR, AND TRANSMISSION TYPE DISPLAY DEVICE

TECHNICAL FIELD

The present invention relates to an image display device which forms an image, a projector which enlarges and projects the image of the image display device, and a transmission type display device which optically guides the image of the image display device and allows an observer to visually recognize the image.

BACKGROUND ART

As a device allowing an observer to visually recognize a video by incorporating an image display device which forms an image, various devices regarding a transmission type display device, for example, a head mount display (in the following, also referred to as an HMD) to be mounted on a head of the observer or the projector are proposed. Specifically, as a display applicable to the HMD or the projector, a display in which a plurality of half mirrors are disposed to enlarge a light flux for display is known (see PTL 1) and, for example, a technique in which an image for the right eye and an image for the left eye are allowed to be recognized visually and respectively when displaying the image so as to allow a stereoscopic image to be visually recognized is known (see PTL 1).

As the projector, a technique for projecting an image onto a surface (that is, three-dimensional surface) having recessed and protruded surface other than a plane is known (for example, see PTLs 2 and 3).

However, in a technique disclosed in PTL 2 or the like, even if projection to a curved surface of which the shape is decided in advance to a certain extent and which has a smooth curvature is possible, it was difficult to perform focusing on, for example, a concave surface or a convex surface having a complicated shape in which an abrupt step difference occurs.

As another problem to be solved, although there is a technique in which in a case where an image from an image display device is optically guided so as to allow a video to be visually recognized as in, for example, the HMD, the image is viewed in binocular vision by a configuration of a pair of right and left and images (image obtained by slightly shifting a common image in the right and left) different in the right and left are reflected when being viewed in binocular vision so as to perform stereoscopic vision by utilizing parallax, a distance between videos is not changed, and thus, focus adjustment (in the following, accommodation) of the eyes is constant and vergence-accommodation conflict occurs. It is desirable that natural stereoscopic vision becomes possible by eliminating the vergence-accommodation conflict as much as possible.

Furthermore, in the projector enlarging and projecting the image from the image display device, for example, in a case where a shape of a screen is not a plane, it is desirable to perform focusing especially, even in a case of a complicated concave surface or convex surface.

CITATION LIST

Patent Literature

PTL 1: Japanese Patent No. 5282358
PTL 2: JP-A-2011-242580
PTL 3: JP-A-2000-67788

SUMMARY OF INVENTION

Technical Problem

The present invention has been made by taking the problems described above into consideration and has an object to provide an image display device which is capable of being incorporated into a projector, an HMD, and the like and in which when an image is displayed by a projector, a focus position to a surface to be irradiated can be adjusted for each image area or a display-assumed-position assumed as a display position of an image visually recognized as a virtual image in the HMD can be adjusted for each image area, that is, an image formation position can be adjusted for each image area, a projector, and a transmission type display device that incorporate the image display device. Here, the image area means an area formed by, for example, a plurality of pixels or a single pixel constituting an image.

In order to achieve the object described above, an image display device according to the present invention includes an illumination optical system which emits light, an optical modulation device which modulates light emitted from the illumination optical system, and a refractive index distribution variable panel which is disposed at a rear stage in an optical path of the optical modulation device and which changes a refractive index in a pixel unit or in an area unit including a plurality of pixels depending on a passing area of light emitted from the optical modulation device.

In the image display device, the refractive index distribution variable panel in which the refractive index is changed by a pixel unit is disposed at a rear stage in the optical path of the optical modulation device, that is, behind the optical modulation device so that the refractive index distribution is changed regarding the passing area of light emitted from the optical modulation device by a pixel unit of the refractive index distribution variable panel and a back focus can be varied for each image display area (for each pixel of an image in a case where the pixel unit of the refractive index distribution variable panel coincides with a pixel unit of a panel constituting the optical modulation device). With this, when the image display device is incorporated into the projector, it becomes possible to adjust the focus position to the surface to be irradiated for each image area by the pixel unit of the refractive index distribution variable panel when the image is displayed, in the projector. When the image display device is incorporated into the HMD, in the HMD, it becomes possible to adjust the display-assumed-position assumed as the image to be visually recognized for each image area by the pixel unit of the refractive index distribution variable panel and more natural stereoscopic vision becomes possible. It is also possible to configure a far-field virtual image display capable of observing an image from an arbitrary position as well as a fixed position by adopting the image display device described above.

According to a specific aspect of the present invention, the refractive index distribution variable panel is a light transmission type liquid crystal panel. In this case, it is possible to change the refractive index by the pixel unit of the liquid crystal panel by using characteristics of liquid crystal molecules.

According to another aspect of the present invention, an emission side polarization plate which aligns polarization states of light to be incident onto the refractive index distribution variable panel is further included between the optical modulation device and the refractive index distribution variable panel. In this case, it is possible to cause light polarized in a specific direction by the emission side polarization plate to be incident onto the refractive index distribution variable panel.

According to still another aspect of the present invention, the optical modulation device is a light transmission type liquid crystal light valve and one pixel constituting the refractive index distribution variable panel corresponds to one or more pixels constituting the liquid crystal light valve. In this case, it is possible to adjust a refractive index in the refractive index distribution variable panel by being corresponded to one liquid crystal pixel or every plurality of liquid crystal pixels that constitute the light transmission type liquid crystal light valve as the optical modulation device.

According to still another aspect of the present invention, the refractive index distribution variable panel is a vertical alignment type liquid crystal panel. In this case, it is possible to minimize the refractive index at, for example, an off state where a voltage is not applied.

In order to achieve the object described above, the projector according to the present invention includes the image display device described in any of above-described matters and a projection optical system which projects light modulated by the optical modulation device. In this case, the image display device described above is incorporated and thus, it is possible to adjust the focus position to the surface to be irradiated for each image area when an image is displayed.

According to a specific aspect of the present invention, the refractive index distribution variable panel is disposed between the optical modulation device and the projection optical system. In this case, it is possible to project light, for which the focus position to the surface to be irradiated is adjusted for each image area by the refractive index distribution variable panel, by the projection optical system.

According to still another aspect of the present invention, a shape obtaining portion which obtains information of a surface shape of a surface to be irradiated by the projection optical system and a refractive index distribution controller which controls refractive index distribution in the refractive index distribution variable panel based on information obtained in the shape obtaining portion are further included. In this case, it is possible to suitably perform adjustment of the refractive index distribution variable panel according to the surface shape of the surface to be irradiated.

In order to achieve the object described above, the transmission type display device according to the present invention includes the image display device described in any of above-described matters and a light guide device which guides light while reflecting video light from the image display device by an inner surface side. In this case, the image display device is incorporated and accordingly, it is possible to adjust the display-assumed-position of an image, which is visually recognized as a virtual image by, for example, light guided by the light guide device toward a user, for each image area.

According to a specific aspect of the present invention, the refractive index distribution variable panel is disposed between the optical modulation device and the light guide device. In this case, it is possible to allow light, which is in a state where the display-assumed-position of the image is adjusted by the refractive index distribution variable panel, to be guided by the light guide device.

According to still another aspect of the present invention, the image display device and the light guide device are respectively configured with a pair of the right and left so that video light for the right eye and video light for the left eye are respectively generated, and the refractive index distribution variable panel configured with the pair of the right and left is changed for each pixel unit or each area unit such that the refractive index distribution is different between video light for the right eye and video light for the left eye. In this case, it is possible to allow binocular vision by the configuration of the pair of right and left, and in this case, it is possible to perform stereoscopic vision of the image by utilizing parallax or to allow more natural stereoscopic vision by reducing the vergence-accommodation conflict.

BRIEF DESCRIPTION OF DRAWINGS

FIG. 5(A) is a diagram conceptually illustrating a situation of an example of a surface to be irradiated and FIG. 5(B) is a graph illustrating a situation in which the refractive index is changed in a case of FIG. 5(A).

DESCRIPTION OF EMBODIMENTS

[First Embodiment]

In the following, a projector in which an image display device according to a first embodiment of the present invention is incorporated will be described in detail with reference to the accompanying drawings.

Figure 1:
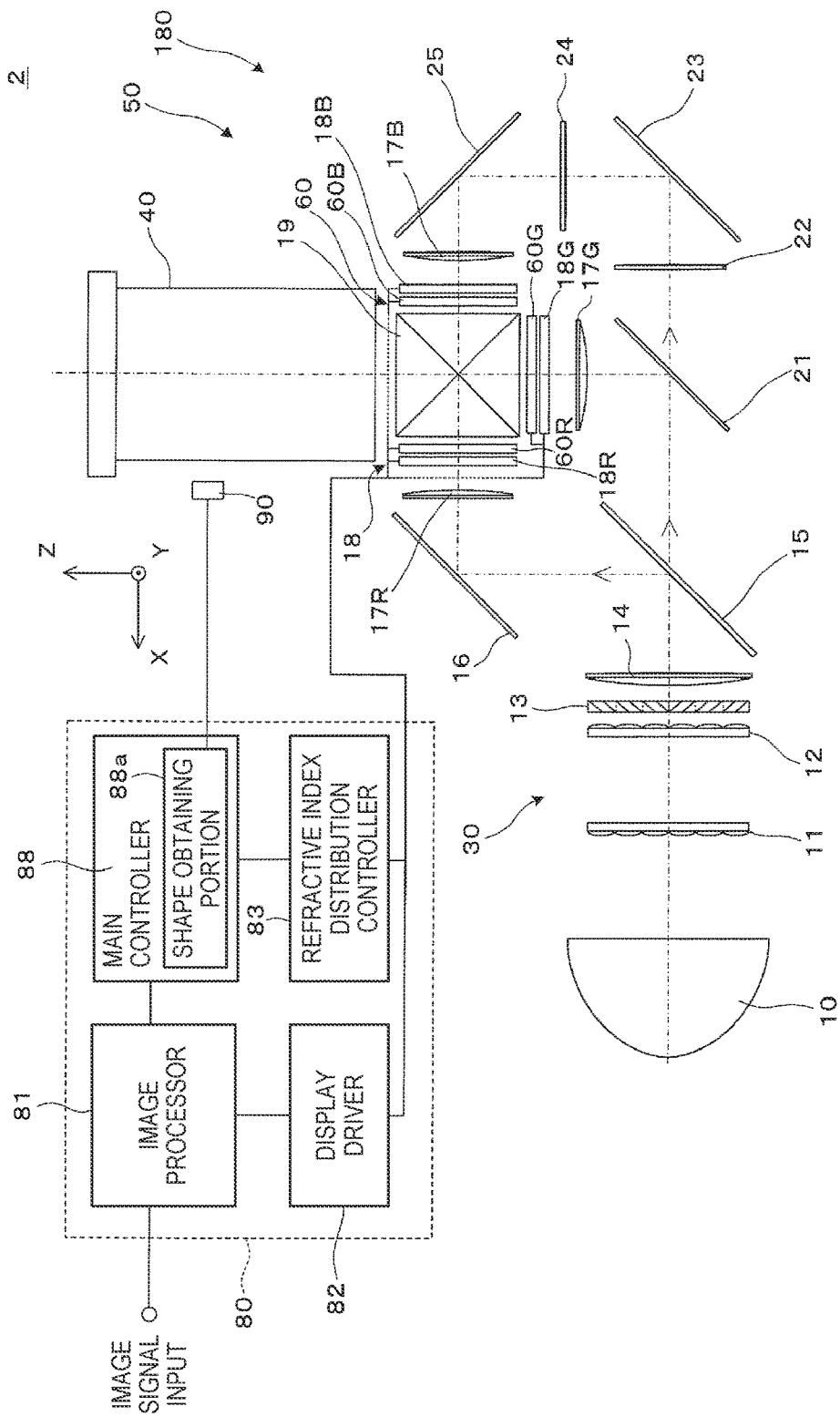
FIG. 1 is a diagram illustrating a schematic configuration of a projector in which an image display device of a first embodiment is incorporated.

As illustrated in FIG. 1, a projector 2 in which the image display device according to the first embodiment of the present invention is incorporated includes an optical system portion 50 projecting image light and a circuit device 80 controlling an operation of the optical system portion 50. Furthermore, the projector 2 further includes an image-capturing camera 90 for distance measurement for obtaining information of a surface shape of a surface to be irradiated (not illustrated) such as a screen.

The optical system portion 50 includes an illumination optical system 20 including a light source 10 emitting illumination light, a color separation light guide optical system 30 separating illumination light into color light beams of respective colors and guiding the color light beams, an optical modulation device 18 spatially modulating respective color light beams separated by the color separation light guide optical system 30, a back focus adjusting device 60 for adjusting a back focus regarding light from the optical modulation device 18, a cross dichroic prism 19 which is a combining optical system for combining color light (modulated light) via the optical modulation device 18 and the back focus adjusting device 60, and a projection optical system 40 projecting combined light obtained by combining light beams. Among these components, especially, in the present embodiment, three refractive index distribution variable panels 60R, 60G, and 60B are provided at the rear stage in an optical path of light transmission type liquid crystal light valves 18R, 18G, and 18B constituting the optical modulation device 18 as the back focus adjusting device 60 for adjusting the back focus for each display area. That is, the refractive index distribution variable panels 60R, 60G, and 60B are disposed between corresponding liquid crystal light valves 18R, 18G, and 18B and the projection optical system 40. In the projector 2, a portion except for the projection optical system 40 may be regarded as an image display device 180 forming image light with which a projected video is displayed.

In the optical system portion 50, the illumination optical system 20 includes a first integrator lens 11, a second integrator lens 12, a polarization conversion element 13, and a superposed lens 14, in addition to the light source 10.

The light source 10 is, for example, an ultra-high pressure mercury lamp and emits light including an R light beam, a G light beam, and a B light beam. Here, the light source 10 may be a discharge light source other than then ultra-high pressure mercury lamp, and otherwise, maybe a solid state light source such as laser or an LED.

The first integrator lens 11 and the second integrator lens 12 include a plurality of lens elements arranged in an array shape. The first integrator lens 11 splits light flux from the light source 10 into a plurality of pieces of light flux. Respective lens elements of the first integrator lens 11 condense light flux from the light source 10 on a portion in the vicinity of lens elements of the second integrator lens 12. The lens elements of the second integrator lens 12 cooperate with the superposed lens 14 to form images of the lens elements of the first integrator lens 11 on panel portions of the liquid crystal light valves 18R, 18G, and 18B. By the configuration as described above, the entirety of the display areas of the liquid crystal light valves 18R, 18G, and 18B is illuminated with substantially uniform brightness by light from the light source 10.

A polarization conversion element 13 converts light from the second integrator lens 12 into predetermined linearly polarized light. The superposed lens 14 superposes images of respective lens elements of the first integrator lens 11 on the display areas of the liquid crystal light valves 18R, 18G, and 18B through the second integrator lens 12.

In the optical system portion 50, the color separation light guide optical system 30 includes dichroic mirrors 15 and 21, reflection mirrors 16, 23, and 25, relay lenses 22 and 24, and field lenses 17R, 17G, and 17B.

The first dichroic mirror 15 reflects the R light beam incident from the superposed lens 14 and transmits the G light beam and the B light beam incident from the superposed lens 14. The R light beam reflected by the first dichroic mirror 15 is incident onto the liquid crystal light valve 18R, which is an optical modulation device, via the reflection mirror 16 and the field lens 17R. The liquid crystal light valve 18R modulates the R light beam according to an image signal to form an R color image.

The second dichroic mirror 21 reflects the G light beam from the first dichroic mirror 15 and transmits the B light beam from the first dichroic mirror 15. The G light beam reflected by the second dichroic mirror 21 is incident on the liquid crystal light valve 18G which is an optical modulation device via the field lens 17G. The liquid crystal light valve 18G modulates the G light beam according to an image signal to form a G color image. The B light transmitted through the second dichroic mirror 21 is incident onto the liquid crystal light valve 18B which is an optical modulation device via the relay lenses 22 and 24, the reflection mirrors 23 and 25, and the field lens 17B. The liquid crystal light valve 18B modulates the B light beam according to an image signal to form a B color image.

The liquid crystal light valves 18R, 18G, and 18B which are the optical modulation device 18 include a light non-emission type liquid crystal panel which modulates an intensity spatial distribution of each of color light beams which are three pieces of incident illumination light respectively corresponding to color light beams of three colors (red, green, blue). In other words, each of the liquid crystal light valves 18G, 18R, and 18B includes a transmission type liquid crystal pixel matrix (liquid crystal panel). Specifically, each of the liquid crystal light valve 18G, 18R, and 18B includes a liquid crystal pixel matrix, an incidence side polarization plate provided at a light incidence side of a pixel matrix, and an emission side polarization plate provided at a light emission side of the pixel matrix. In the following, a control operation of each of the liquid crystal light valves 18G, 18R, and 18B will be simply described. First, the projector controller 80 converts an input image signal to an image light valve control signal. Next, a panel driver which is not illustrated is controlled by the converted image light valve control signal. Three liquid crystal light valves 18G, 18R, and 18B driven by the controlled panel driver respectively modulate color light beams of three colors to form an image according to inputted image information (image signal). Here, for example, resolution of each of the liquid crystal light valves 18R, 18G, and 18B is full HD.

The refractive index distribution variable panels 60R, 60G, and 60B as the back focus adjusting device 60 are installed near downstream sides in the optical path of respective liquid crystal light valves 18R, 18G, and 18B by being corresponded to the liquid crystal light valves 18R, 18G, and 18B constituting the optical modulation device 18. The refractive index distribution variable panels 60R, 60G, and 60B are light non-emission type transmission type liquid crystal panels and are configured with the light transmission type liquid crystal pixel matrix. In the refractive index distribution variable panels 60R, 60G, and 60B, a state of liquid crystal molecules is changed by a pixel unit that constitutes the liquid crystal pixel matrix so as to make it possible to change a refractive index of light (polarized light) to be passed through the panels. That is, the refractive index distribution variable panel 60R, 60G, and 60B change the refractive index of light emitted from each of corresponding liquid crystal light valves 18R, 18G, and 18B by the pixel unit depending on a passing area of light. Matters that resolution of the refractive index distribution variable panels 60R, 60G, and 60B is set to, for example, the same standard (resolution is full HD in the above-described case) so as to be matched with resolution of the liquid crystal pixels constituting each of liquid crystal light valves 18R, 18G, and 18B, that is, set to become a one-to-one relationship is considered. In this case, it is possible to adjust the refractive index by the pixel unit in displaying in each of the liquid crystal light valves 18R, 18G, and 18B. A correspondence relationship between the liquid crystal pixels may be plural-to-one. That is, the liquid crystal pixels constituting the refractive index distribution variable panels 60R, 60G, and 60B may be made rougher than those constituting the liquid crystal light valves 18R, 18G, and 18B. In this case, it becomes possible to adjust the refractive index by an area unit (area unit corresponding to plural pixel areas of liquid crystal light valves 18R, 18G, and 18B) according to roughness of the liquid crystal pixel.

The cross dichroic prism 19 is a prism for combining light beams and combines light beams modulated by the respective liquid crystal light valves 18R, 18G, and 18B and also passed through the refractive index distribution variable panels 60R, 60G, and 60B to set as image light and allow image light to advance to the projection optical system 40.

The projection optical system 40 is a projection lens that enlarges and projects image light combined by the cross dichroic prism 19 on a screen (surface to be irradiated) which is not illustrated.

The circuit device 80 includes an image processor 81 to which an external image signal is input such as a video signal, a display driver 82 driving the liquid crystal light valves 18G, 18R, and 18B provided in the optical system portion 50 based on an output of the image processor 81, a refractive index distribution controller 83 driving the refractive index distribution variable panels 60R, 60G, and 60B so as to control the refractive index distribution, and a main controller 88 for integrally controlling operations of these circuit portions 81, 82, and 83, and the like. The main controller 88 further includes a shape obtaining portion 88a for obtaining information of a surface shape of a surface to be irradiated (not illustrated) such as a screen based on distance measurement by the image-capturing camera 90.

The image processor 81 converts the input external image signal into an image signal including gradation of each color, or the like. The image processor 81 can perform various image processing such as a distortion correction or a color correction on the external image signal.

The display driver 82 can operate the liquid crystal light valves 18G, 18R, and 18B based on the image signal output from the image processor 81 and can form an image corresponding to the image signal or another image obtained by conducting image processing on the image in the liquid crystal light valves 18G, 18R, and 18B.

The refractive index distribution controller 83 controls the refractive index distribution in the refractive index distribution variable panels 60R, 60G, and 60B based on information about the surface shape of the surface to be irradiated obtained through the image-capturing camera 90 in the shape obtaining portion 88a of the main controller 88.

Figure 2:
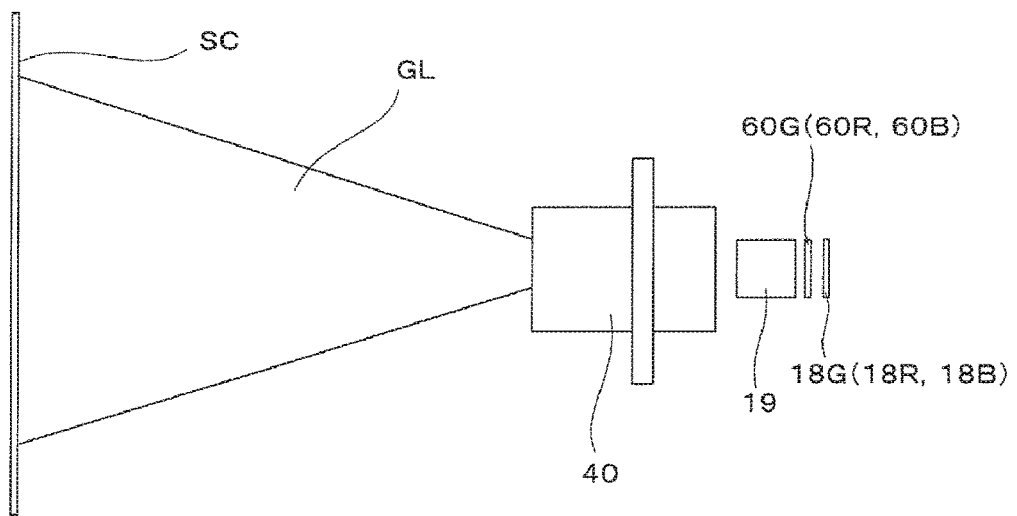
FIG. 2 is a diagram conceptually illustrating a situation of image projection by the projector.
Figure 3:
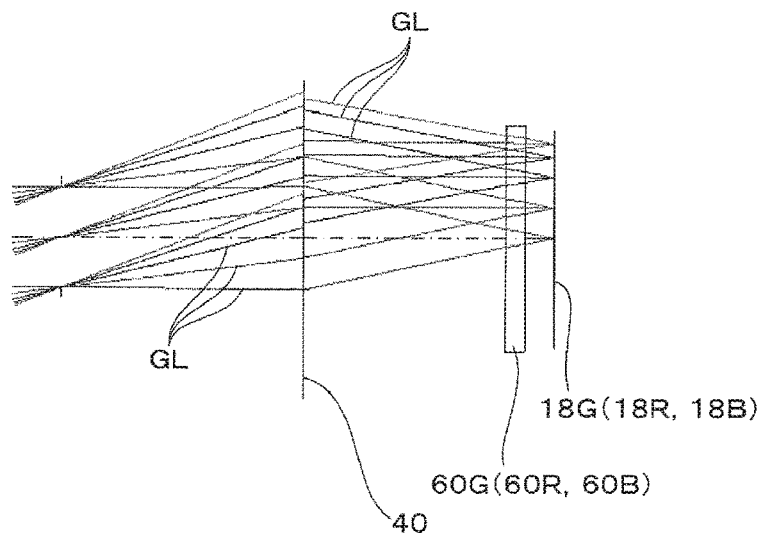
FIG. 3 is a diagram conceptually illustrating a situation of light beams in a case where a projection optical system is modelled.

In the following, the refractive index distribution variable panel 60R, 60G, 60B of the present embodiment will be specifically described with reference to FIG. 2 or the like. Here, configurations and functions of three refractive index distribution variable panels 60R, 60G, and 60B are the same and thus, only one refractive index distribution variable panel 60G will be described and description of other refractive index distribution variable panels 60R and 60B is omitted. FIG. 2 is a diagram conceptually illustrating a situation of image projection (projection of video light GL) by the projector 2. Here, in order to simplify description, regarding a case illustrated in FIG. 2, it is considered that the projection optical system 40 is assumed to be modelled by ideal lenses, as illustrated in FIG. 3. That is, when aberration is not generated at a position where an image forming relation is set, it is idealized one.

Figure 4A:
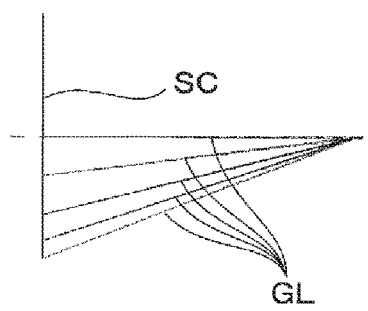
FIG. 4(A) is a diagram illustrating a situation in which projection is performed on a plane in a case FIG. 3.
Figure 4B:
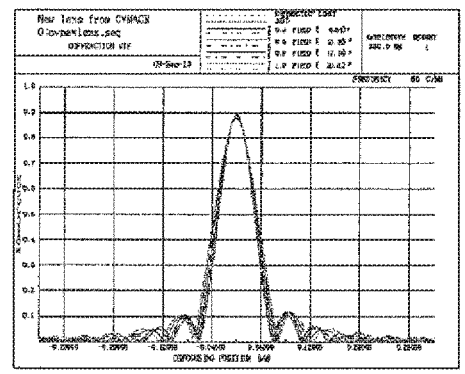
FIG. 4(B) is a diagram illustrating a situation of focusing at a position in image-height in a case where a refractive index of a refractive index distribution variable panel is uniform in FIG. 4(A)
Figure 4C:
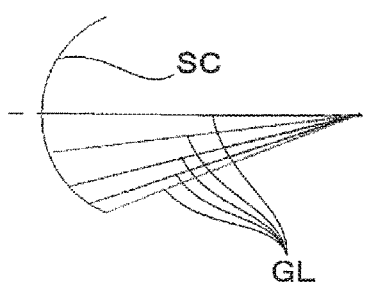
FIG. 4(C) is a diagram illustrating a situation in which projection is performed on a spherical surface in a case of FIG. 3.
Figure 4D:
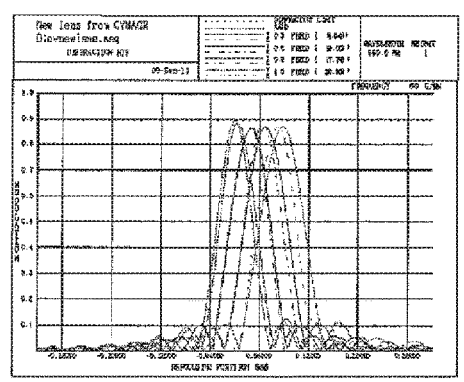
FIG. 4(D) is a diagram illustrating a situation of focusing at a position in image-height in a case where the refractive index of the refractive index distribution variable panel is uniform in FIG. 4(C)

In a case illustrated in FIG. 3, matters that projection by the projector 2 is performed on a surface to be irradiated having various shapes is considered. First, as illustrated in FIG. 4(A), a case where projection is performed on a plane is considered. Here, it is assumed that the refractive index is uniform as it is in the refractive index distribution variable panel 60G (60R, 60B). In this case, as illustrated in FIG. 4(B), focusing at a position in image-height of respective projected light beams are made at all positions in image-heights. Here, in FIG. 4(B), a focus amount is represented on the horizontal axis and the MTF of 60 lp/mm is represented on the vertical axis. In contrast, as illustrated in FIG. 4(C), a case where the projection is performed on a spherical surface is considered. In this case, when the refractive index is uniform as it is, it becomes a state where focusing is not made due to the position in image-height, as in the graph (horizontal axis and vertical axis are the same as those of FIG. 4(B)) of the MTF illustrated in FIG. 4(D). That is, an image is not formed (is not resolved) in a peripheral area of the surface to be irradiated. Such degradation of image formation (resolution) is caused by matters that when the refractive index is uniform as it is in the refractive index distribution variable panel 60G, a projection distance at the optical axis or in the peripheral area of the optical axis is different from a projection distance at an area of a peripheral side apart from the optical axis.

Figure 4E:
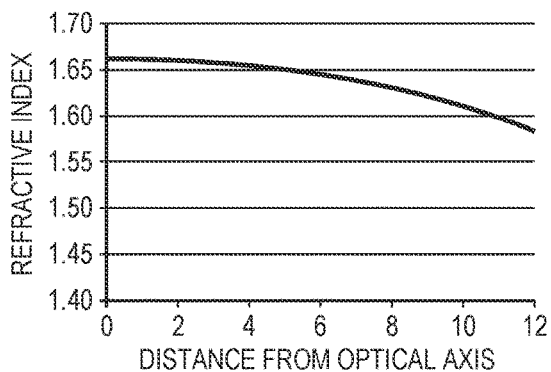
FIG. 4(E) is a graph illustrating an example in which the refractive index of the refractive index distribution variable panel is changed.
Figure 4F:
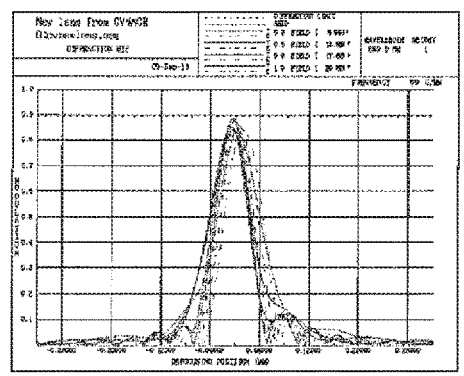
FIG. 4(F) is a diagram illustrating a situation of focusing at a position in image-height in a case where refractive index distribution of FIG. 4(E) is used in FIG. 4(C).

In contrast to the above-description, in the present embodiment, for example, as illustrated in FIG. 4(E), the refractive index in the refractive index distribution variable panel 60G provided in the closest rear stage of the liquid crystal light valve 18G is changed. Here, FIG. 4(E) is a graph in which a distance from the optical axis is represented by the horizontal axis and the refractive index is represented by the vertical axis. That is, in a case of FIG. 4(E), when projection is performed on the spherical surface illustrated in FIG. 4(C), the refractive index is changed to become lower as it goes from the optical axis to the periphery. In other words, the refractive index distribution is a distribution in which the refractive indices are changed by being corresponded to the surface shape of the surface to be irradiated. FIG. 4(F) illustrates (horizontal axis and vertical axis are the same as those of FIG. 4(B)) the MTF in a case where the refractive index distribution described above is given. In this case, it is seen that focusing is made in all areas. That is, it is possible to allow light emitted from the liquid crystal light valve 18G to pass at the refractive index different for each area in the refractive index distribution variable panel 60G disposed in the closest rear stage of the liquid crystal light valve 18G. This, so to speak, corresponds to matters that the back focus position is adjusted for each display pixel area (or for each pixel unit).

In the projector 2 of the present embodiment, as in the example of FIG. 4(C), it is possible to perform projection on a surface to be irradiated having various surface shapes, in addition to the case where projection is performed on a surface to be irradiated having a spherical surface shape. Specifically, for example, even in a case where a screen SC (see FIG. 2), which is a surface to be irradiated, has a shape of a complicated concave surface or convex surface and also another shape obtained by combining the concave surface and the convex surface as illustrated in FIG. 5(A), the refractive index of the refractive index distribution variable panel 60G (60R, 60B) is caused to be changed as in the graph illustrated in FIG. 5(B) so as to make it possible to perform focusing at respective positions on the screen SC.

Figure 6A:
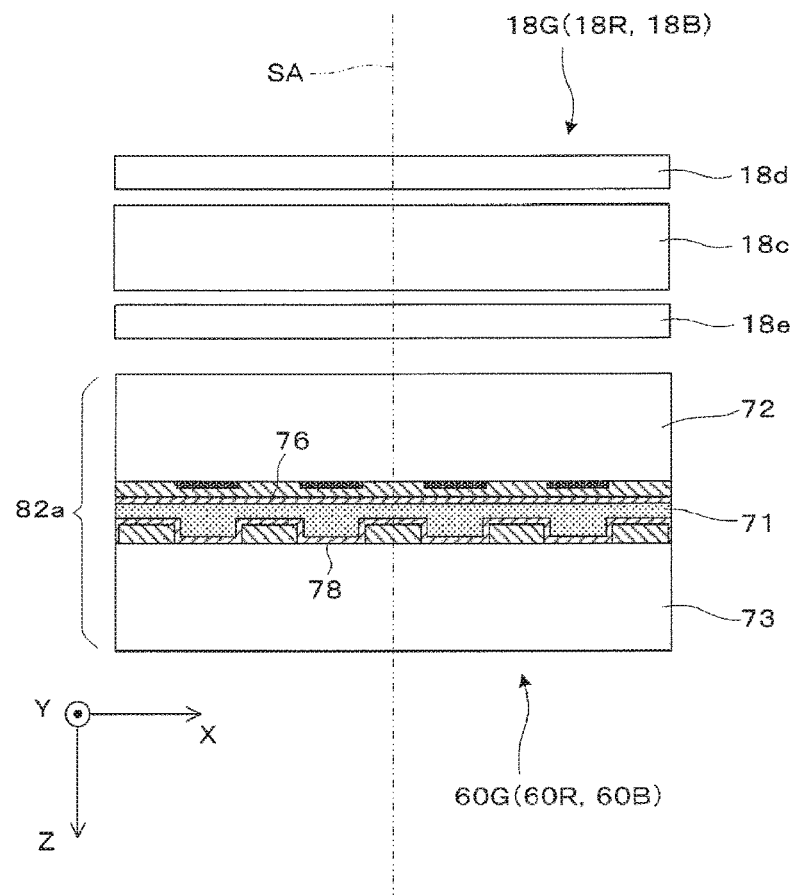
FIG. 6(A) is a diagram for explaining an example of a configuration of the refractive index distribution variable panel and FIG. 6(B) is a diagram conceptually illustrating a situation of a liquid crystal compound constituting a liquid crystal layer.

In the following, a specific example of the refractive index distribution variable panel 60G (60R, 60B) will be described in more detail. FIG. 6(A) is a diagram for explaining a liquid crystal device constituting the refractive index distribution variable panel 60G (60R, 60B). In FIG. 6(A), a corresponding liquid crystal light valve 18G is also illustrated.

As illustrated in FIG. 6(A), a liquid crystal device 82a, which is a main body of the refractive index distribution variable panel 60G, is a vertical alignment type liquid crystal device including a first substrate 72 at the incidence side and a second substrate 73 at the emission side that sandwich, for example, a liquid crystal layer 71. The liquid crystal light valve 18G includes a liquid crystal panel 18c which is a liquid crystal pixel matrix, an incidence side polarization plate 18d provided at the light incidence side of the liquid crystal panel 18c, and an emission side polarization plate 18e provided at the light emission side of the liquid crystal panel 18c and emits light in a state of being polarized parallel to, for example, the X-axis, by the emission side polarization plate 18e.

Figure 6B:
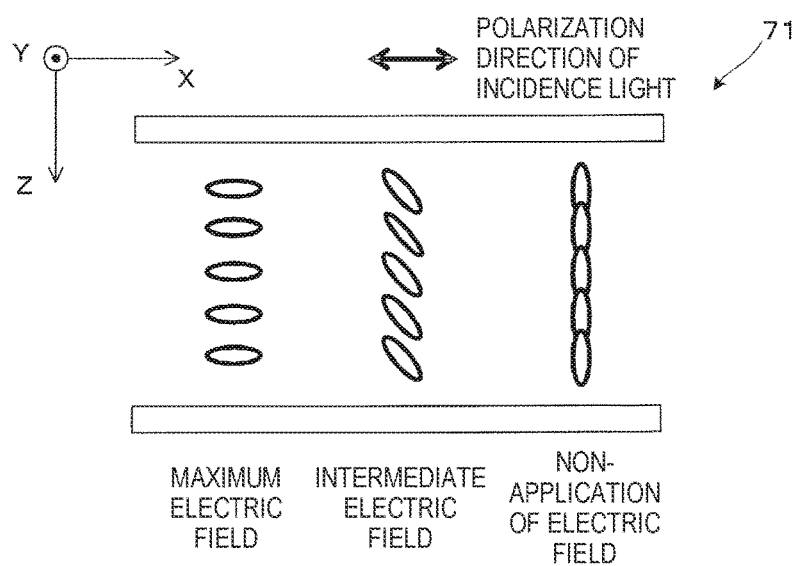

Referring back to the liquid crystal device 82a, the substrates 72 and 73 constituting the liquid crystal device 82a are formed in a flat plate shape and the normal line of the incidence and emission surface is disposed to be parallel to a system optical axis SA, that is, the Z-axis. For example, in the vertical alignment type liquid crystal device 82a, in a case where the liquid crystal layer 71 is constituted with liquid crystals having positive refractive index anisotropy and negative dielectric anisotropy, alignment films 76 and 78 have the function of arranging the liquid crystal compound, which constitutes the liquid crystal layer 71, to be substantially parallel to the system optical axis SA, that is, the Z-axis in the state of no existence of an electric field (see FIG. 6(B)). As illustrated in FIG. 6(B), when the electric field is applied in a direction along the Z-axis, the liquid crystal compound constituting the liquid crystal layer 71 is inclined from a state of being substantially parallel to the system optical axis SA, that is, the Z-axis toward a predetermined direction within, for example, the XY plane. Here, the predetermined direction is substantially the same as the direction of polarized light emitted from the emission side polarization plate 18e. With this, in the direction (predetermined direction within the XY plane) of polarized light emitted from the emission side polarization plate 18e, the refractive index is increased, from a state where the electric field is not applied at which the refractive index becomes the minimum refractive index, depending on a magnitude of applied electric field.

As described above, in the image display device of the present embodiment, it is possible to change the refractive index distribution by the pixel unit of the refractive index distribution variable panel regarding the passing area of light emitted from the optical modulation device. Accordingly, in the projector in which the image display device of the present embodiment is incorporated, the refractive index distribution variable panel capable of varying the refractive index distribution is inserted immediately after the optical modulation device so that focusing can be made in all areas even in a screen (surface to be irradiated) having any shape.

[Second Embodiment]

In the following, a transmission type display device in which an image display device according to a second embodiment of the present invention is incorporated will be described in detail with reference to FIGS. 7 and 8.

Figure 7:
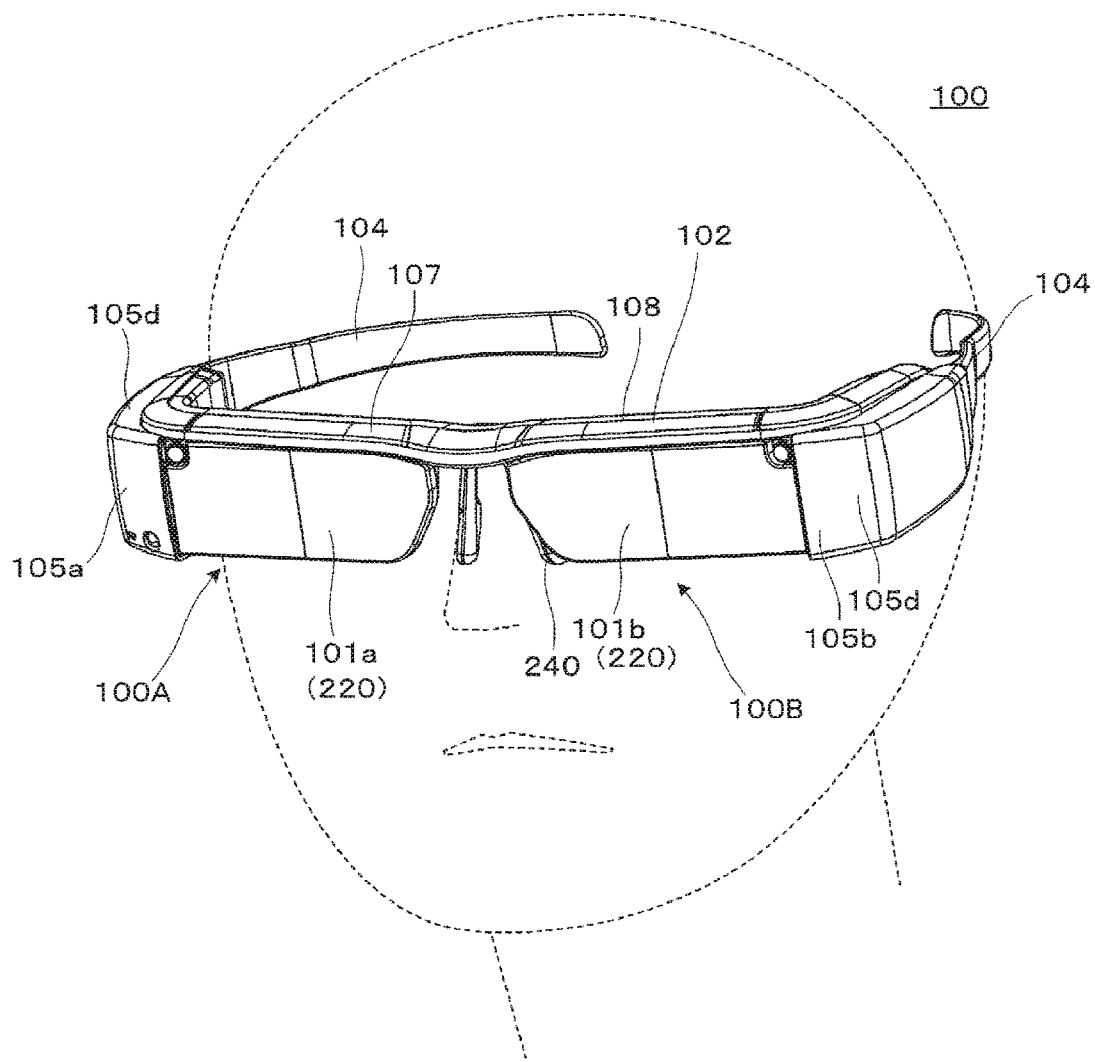
FIG. 7 is a perspective view simply explaining the appearance of an example of a transmission type display device in which an image display device of a second embodiment is incorporated.

As illustrated in FIG. 7, a transmission type display device 100 of the present embodiment is a head mount display having appearance like glasses and is a virtual image display device capable of allowing an observer or a user who wears the transmission type display device 100 to visually recognize image light (video light) by a virtual image and allowing an observer to visually recognize or observe an external image in a see-through manner. The transmission type display device 100 includes first and second optical members 101a and 101b covering the front of eyes of an observer to be capable of being seen through, a frame portion 102 supporting both optical members 101a and 101b, and first and second image forming main body portions 105a and 105b added to a portion extending from both right and left ends of the frame portion 102 to a backward curved portion 104 (temple). Here, a first display device 100A obtained by combining the first optical member 101a and the first image forming main body portion 105a located on the left side in the drawing is a portion forming a virtual image for the right eye and also functions singly as a transmission type display device. A second display device 100B obtained by combining the second optical member 101b and the second image forming main body portion 105b located on the right side in the drawing is a portion forming a virtual image for the left eye and also functions singly as the transmission type display device. When FIG. 8 is compared with FIG. 7, for example, the first and second image forming main body portions 105a and 105b are respectively configured by an image display device 280 including a projection lens 230 accommodated in a lens barrel portion 39 and a video display element (video element) 282.

Figure 8:
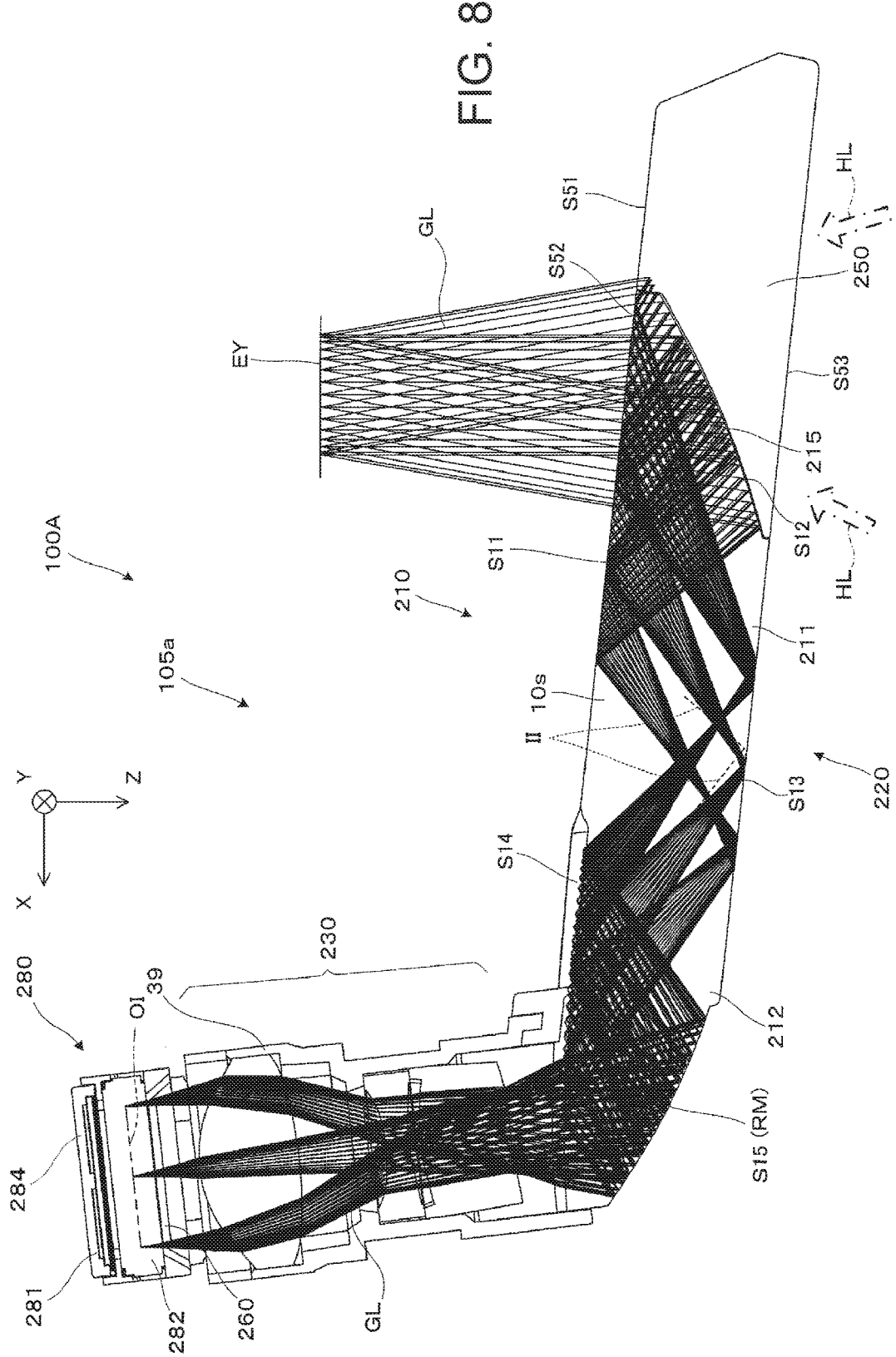
FIG. 8 is a diagram illustrating an optical path of video light in the transmission type display device.

As illustrated in FIGS. 7 and 8, the frame portion 102 provided in the transmission type display device 100 includes a frame 107 disposed at the upper end side and a resin portion 108 disposed at a rear side thereof along the frame 107. The frame 107 is an integral component made of metal and formed with an aluminum die-cast material and other various metal materials. The resin portion 108 is disposed along the frame 107 and cooperates with the frame 107 by being engaged therewith so as to make it possible to accommodate, for example, various cables for image formation. A nose reception portion 240 is provided in addition to the frame portion 102.

As illustrated in FIG. 8, the first display device 100A includes the first optical member 101a or a light guide device 220 and the projection lens 230 for image formation. The first optical member 101a or the light guide device 220 is configured with a light guide member 210 for light guide and see-through and a light transmission member 250 for see-through. The first image forming main body portion 105a is configured with the image display device 280 and the projection lens 230.

The image display device 280 includes an illumination device 281 which is a backlight emitting illumination light to the video display element 282 and a drive controller 284 controlling the operations of the video display element 282, or the like, in addition to the video display element (video element) 282 which is a light transmission type optical modulation device.

In the following, an optical configuration of the transmission type display device 100 will be described in detail with reference to FIG. 8. More specifically, the image display device 280 and the projection lens 230 constituting the first image forming main body portion 105a will be described in detail.

The image display device 280 includes a refractive index distribution variable panel 260 disposed between the video display element 282 and the light guide device 220, the illumination device 281 which is an illumination optical system emitting illumination light to the video display element 282, and the drive controller 284 controlling operations of the illumination device 281, the video display element 282, and the refractive index distribution variable panel 260, in addition to the video display element 282 which is the optical modulation device. The illumination device 281 of the image display device 280 includes a light source generating light beams of three colors of red, green, and blue and a backlight light-guiding unit which diffuses light from the light source thereof and causes light fluxes of having a rectangular cross-section. The video display element (video element) 282 is formed with, for example, the liquid crystal display device, configured with a plurality of pixels, and spatially modulates illumination light from the illumination device 281 to form image light to be a display target such as a moving image. The refractive index distribution variable panel 260 is a liquid crystal pixel matrix provided by being corresponded to the liquid crystal display device that constitutes the video display element 282 and is configured with the liquid crystal pixels of which the number of pixels is in a one-to-one relationship or plural-to-one relationship with respect to the liquid crystal pixels of the video display element 282. Although an illustration is omitted, the drive controller 284 is configured with a light source driving circuit which supplies power to the illumination device 281 and emits illumination light having stable brightness and a liquid crystal driving circuit which forms color video light or image light to be an original image of a moving image or a still image as a transmittance pattern by outputting an image signal or a driving signal to the video display element (video element) 282. Although the liquid crystal driving circuit may be equipped with an image processing function, the image processing function may be equipped in an external control circuit.

The projection lens 230 is a projection optical system including three optical elements (lenses) along the incidence side optical axis as the constitutional elements and is supported by the lens barrel portion 39 accommodating the optical elements. The projection lens 230 cooperates with a portion of the light guide member 210 to form an intermediate image II, which corresponds to a display image of the video display element 282, in the light guide member 210.

In a second surface S12, a half mirror layer 215 is added with to a surface of a main body 10s. The half mirror layer 215 is formed on a partial area (not illustrated) which sandwiches the second surface S12 mainly in the vertical direction along the Y-axis direction, but not the entirety of the second surface S12.

A third surface S13 functions as a total reflecting surface which totally reflects video light GL at the inner surface side. The third surface S13 is disposed approximately in front of the eyes EY, formed in a plane shape similar to a first surface S11, and when external light HL is seen after allowing external light HL to pass through the first surface S11 and the third surface S13, diopter is 0 due to matters that the first surface S11 and the third surface S13 are surfaces parallel to each other, especially, variable power is not caused.

In a second light guide part 212, a fourth surface S14 functions as a total reflecting surface which totally reflects video light GL at the inner surface side. The fourth surface S14 also functions as a refraction surface which causes video light GL to be incident onto the second light guide part 212. That is, the fourth surface S14 functions as both a light incidence surface which causes video light GL to be incident onto the light guide member 210 from outside and a reflecting surface which causes video light GL to be propagated within the light guide member 210.

In the second light guide part 212, a fifth surface S15 is formed by depositing a light reflection film RM formed of an inorganic material on a surface of the main body 10s and functions as a reflecting surface.

As described above, in the present embodiment, video light from the video display element 282 is guided by reflections conducted five times in a path spanning from the first surface S11 to the fifth surface S15 and including at least twice total reflection, within the light guide member 210. With this, it is possible to establish display of video light GL and see-through allowing external light HL to be visually recognized and perform aberration correction of video light GL.

The half mirror layer 215 is configured with a dielectric multi-layered film which partially reflects video light GL emitted by being guided within the light guide device 220 and also transmits external light HL passing through the light guide device 220 so as to function as a semi-transmission type reflection unit. Accordingly, external light HL incident onto the half mirror layer 215 is partially reflected while being partially transmitted through the half mirror layer 215 and thus, external light HL from the direction corresponding to the half mirror layer 215 becomes weak depending on a transmittance of the half mirror layer 215. On the other hand, video light GL is incident from the direction corresponding to the half mirror layer 215 and thus, the observer can observe an external image together with an image formed on the video display element (video element) 282 in the direction of the half mirror layer 215.

In the present embodiment, in FIG. 7, the transmission type display device 100 is configured with a pair of right and left display devices such that video light for the right eye and video light for the left eye are respectively generated. Especially, in the first display device 100A forming a virtual image for the right eye and the second display device 100B forming a virtual image for the left eye, the image is shifted according to right and left parallax so as to make it possible to display a 3D image. In this case, it is possible to change each of the refractive index distribution variable panels 260 configured with pairs of right and left variable panels of the display devices 100A and 100B by the pixel unit such that the refractive index distributions differ between video light for the right eye and video light for the left eye. That is, when stereoscopic vision using parallax is performed, regarding an image which is visually recognized as a virtual image due to light guided by the light guide device 220, it is possible to adjust a display-assumed-position assumed as a display position of the image for each area corresponding to one pixel of the image or for each area corresponding to a plurality of pixels of the image and reduce the vergence-accommodation conflict.

As described above, in the image display device of the present embodiment, it is possible to change the refractive index distribution with respect to the passing area of light emitted from the optical modulation device by the pixel unit of the refractive index distribution variable panel. Accordingly, in the transmission type display device in which the image display device of the present embodiment is incorporated, the refractive index distribution variable panel capable of varying the refractive index distribution is inserted immediately after the optical modulation device so as to make it possible to adjust the display-assumed-position of the image by the pixel unit, which is visually recognized as the virtual image, and allow more natural stereoscopic vision, for example, when stereoscopic vision using parallaxes configured with a pair of right and left parallax is performed.

The present invention is not limited to the embodiments and examples described above and can be embodied by various aspects in a range without departing from a gist thereof.

For example, various liquid crystal panels can be applied regarding a liquid crystal panel to be applied to each refractive index distribution variable panel, and a plurality of liquid crystal panels may be laminated in the optical axis direction depending on, for example, a necessary refractive index difference and a thickness may be appropriately maintained. It is possible to apply a panel having a reaction rate sufficient for a need.

In the above-description, although a vertical alignment type refractive index distribution variable panel is described as an example of a refractive index distribution variable panel, another type liquid crystal panel other than the vertical alignment type may be adopted. For example, a λ/4 plate and a TN liquid crystal may be combined.

In the above-description, the illumination optical system and a light non-emission type optical modulation device are used and a light transmission type liquid crystal panel is used as the optical modulation device, but is not limited thereto, for example, an aspect in which a self-emissive type element such as an organic EL is applied or an LED light source is utilized is also possible. In this case, in a case where light not polarized is emitted on a light source side, a polarizing plate may be provided at a front stage of each refractive index distribution variable panel such that light incident onto the liquid crystal panel as each refractive index distribution variable panel becomes a polarized state. That is, a configuration in which the emission side polarization plate is included on the light emission side of the optical modulation device may be adopted.

In the first embodiment described above, it is possible to move the refractive index distribution variable panels 60R, 60G, and 60B disposed to be corresponded to respective color light beams in synchronization with each other. For example, the refractive index distribution variable panels 60R, 60G, and 60B may be individually moved for each color light beam by taking chromatic aberration or the like into consideration.

The transmission type display device (HMD) as a virtual image display device indicated in the second embodiment is an example, the refractive index distribution variable panel 260 of the present embodiment can be applied to the HMD according to various aspects or the like, and can be also applied to, for example, an HMD in which an intermediate image is not formed and which is configured with only the image display device and the light guide device without including a projection lens. In the example described above, although the HMD is configured to allow video light and external light to be visually recognized, that is, has a see-through configuration, it can be also applied to an aspect in which only video light is visually recognized and external light is shielded.

The entire disclosure of Japanese Patent Application No. 2015-039950, filed Mar. 2, 2015 is expressly incorporated by reference herein.

The invention claimed is:

1. A projector comprising:
an image display device which includes an illumination optical system which emits light, an optical modulation device which modulates light emitted from the illumination optical system, and a refractive index distribution variable panel which is disposed at a rear stage in an optical path of the optical modulation device and which changes a refractive index in a pixel unit or in an area unit including a plurality of pixels depending on a passing area of light emitted from the optical modulation device;
a projection optical system which projects light from the image display device;
a shape obtaining portion which obtains information of a surface shape of a surface to be irradiated by the projection optical system; and
a refractive index distribution controller which controls refractive index distribution in the refractive index distribution variable panel based on information obtained in the shape obtaining portion.

2. The projector according to claim 1,
wherein the refractive index distribution variable panel is a light transmission type liquid crystal panel.

3. The projector according to claim 1, further comprising:
an emission side polarization plate which aligns polarization states of light to be incident onto the refractive index distribution variable panel between the optical modulation device and the refractive index distribution variable panel.

4. The projector according to claim 1,
wherein the optical modulation device is a light transmission type liquid crystal light valve, and
one pixel constituting the refractive index distribution variable panel corresponds to one or more pixels constituting the liquid crystal light valve.

5. The projector according to claim 1,
wherein the refractive index distribution variable panel is a vertical alignment type liquid crystal panel.

6. The projector according to claim 5,
wherein the refractive index distribution variable panel is disposed between the optical modulation device and the projection optical system.

7. A transmission type display device comprising:
an image display device which includes an illumination optical system which emits light, an optical modulation device which modulates light emitted from the illumination optical system, and a refractive index distribution variable panel which is disposed at a rear stage in an optical path of the optical modulation device and which changes a refractive index in a pixel unit or in an area unit including a plurality of pixels depending on a passing area of light emitted from the optical modulation device; and
a light guide device which guides light while reflecting video light from the image display device by an inner surface side,
wherein the image display device and the light guide device are respectively configured with a pair of the right and left so that video light for the right eye and video light for the left eye are respectively generated, and
the refractive index distribution variable panel configured with the pair of the right and left is changed for each pixel unit or each area unit such that the refractive index distribution is different between video light for the right eye and video light for the left eye.

8. The transmission type display device according to claim 7, wherein the refractive index distribution variable panel is disposed between the optical modulation device and the light guide device.

\* \* \* \* \*